US 6,574,043 B2

(12) United States Patent
Ramanujan

(10) Patent No.: US 6,574,043 B2
(45) Date of Patent: Jun. 3, 2003

(54) METHOD FOR ENHANCED BIT DEPTH IN AN IMAGING APPARATUS USING A SPATIAL LIGHT MODULATOR

(75) Inventor: Sujatha Ramanujan, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 21 days.

(21) Appl. No.: 10/045,216

(22) Filed: Nov. 7, 2001

(65) Prior Publication Data

US 2003/0086166 A1 May 8, 2003

(51) Int. Cl.[7] .................. G02B 27/22; G02B 27/10; G03B 21/00; G06K 9/40; G09G 3/36

(52) U.S. Cl. .................. 359/464; 359/464; 359/618; 353/7; 382/274; 345/95

(58) Field of Search .................. 359/237, 238, 359/276, 290, 291, 298, 462, 464, 466, 618, 245, 634, 637, 487, 29; 349/25, 174; 345/97, 58, 94, 99, 89, 95, 208, 210; 353/20, 31, 33, 34, 37, 7, 10; 355/22, 32; 382/274; 347/239

(56) References Cited

U.S. PATENT DOCUMENTS

| | | | |
|---|---|---|---|
| 5,061,049 A | 10/1991 | Hornbeck | 359/224 |
| 5,159,474 A * | 10/1992 | Franke et al. | 359/29 |
| 5,170,281 A * | 12/1992 | Kobayashi et al. | 359/245 |
| 5,325,137 A | 6/1994 | Konno et al. | 353/63 |
| 5,436,742 A * | 7/1995 | Tanaka et al. | 349/25 |
| 5,521,748 A | 5/1996 | Sarraf | 359/321 |
| 5,652,661 A | 7/1997 | Gallipeau et al. | 358/302 |
| 5,731,797 A * | 3/1998 | Akiyama et al. | 345/97 |
| 5,743,610 A | 4/1998 | Yajima et al. | 353/31 |
| 5,781,267 A * | 7/1998 | Takimoto et al. | 349/174 |
| 5,808,800 A | 9/1998 | Handschy et al. | 359/630 |
| 6,330,018 B1 * | 12/2001 | Ramanujan et al. | 347/239 |
| 6,407,766 B1 * | 6/2002 | Ramanujan et al. | 347/239 |

* cited by examiner

Primary Examiner—Evelyn Lester
Assistant Examiner—Jack Dinh
(74) Attorney, Agent, or Firm—Nelson Adrian Blish

(57) ABSTRACT

A method for increasing the number of intensity levels available on one or more color channels in an imaging apparatus (10) using a spatial light modulator (22). Multiple LUTs (52) are loaded into the imaging data path as data is directed to multiple spatial light modulators (22), wherein each spatial light modulator (22) has a separate bias voltage setting. In an alternate embodiment a single spatial light modulator (22) can be used with multiple LUTs (52) and with a changed bias voltage setting appropriate for use with each LUT (52).

71 Claims, 12 Drawing Sheets

METHOD FOR ENHANCED BIT DEPTH IN AN IMAGING APPARATUS USING A SPATIAL LIGHT MODULATOR

FIELD OF THE INVENTION

This invention generally relates to imaging apparatus using spatial light modulators and more particularly relates to an apparatus and method for providing an expanded range of variable light intensity values to a light beam that is modulated by a spatial light modulator.

BACKGROUND OF THE INVENTION

Two-dimensional spatial light modulators are being widely used in a range of imaging applications from projection of color images to printing of monochrome and color images onto photosensitive media. Because it forms a complete, two-dimensional image at one time without requiring mechanical movement, the spatial light modulator offers a number of advantages over other types of imaging devices, such as scanning lasers, for example.

A spatial light modulator can be considered essentially as a two-dimensional array of light-valve elements, each element corresponding to an image pixel. Each array element is separately addressable and digitally controlled to modulate light by transmitting (or reflecting) or by blocking transmission (or reflection) of incident light from a light source. There are two salient types of spatial light modulators that are employed for forming images in projection and printing apparatus. The liquid crystal device (LCD) modulates an incident beam by selectively altering the polarization of light for each pixel. A transmissive LCD operates by selectively transmitting the incident beam through individual array elements. A reflective LCD selectively changes the polarization of a reflected beam at individual array elements. The second basic type of spatial light modulator currently in use is the digital micromirror device (DMD), disclosed in U.S. Pat. No. 5,061,049. The DMD modulates light by reflection at each individual pixel site.

Spatial light modulators were initially developed for digital projection applications. Examples include display apparatus such as those disclosed in U.S. Pat. No. 5,325,137 to Konno et al. and in U.S. Pat. No. 5,743,610 to Yajima et al.; and miniaturized image display, mounted within a helmet or supported by eyewear, disclosed in U.S. Pat. No. 5,808,800 to Handschy et al. Advantageously, spatial light modulators operate by displaying a complete image frame at a time.

More recently, spatial light modulators have been used in printing apparatus, from line printing systems such as the printer disclosed in U.S. Pat. No. 5,521,748 (Sarraf) to area printing systems, such as the printer disclosed in U.S. Pat. No. 5,652,661 (Gallipeau et al.)

It is instructive to consider some of the more important differences between projection and printing requirements for spatial light modulator devices. Effective image projection requires that the image forming device provide high levels of brightness. In display presentation, the human eye is relatively insensitive to many types of image artifacts and aberrations, since the displayed image is continually refreshed and is viewed from a distance. Motion and change also help to minimize the effects of many types of image artifacts. High resolution is not a concern for projection applications, with 72 pixels per inch normally satisfactory for many types of images.

Image printing, meanwhile, presents a number of different problems. For example, when viewing output from a high-resolution printing system, the human eye is not nearly as "forgiving" to artifacts, aberrations, and non-uniformity, since irregularities in optical response are more readily visible and objectionable on printed output. High resolution may require print output at 1200 dpi or higher, depending on the application. For the purpose of the present application, the general term "imaging apparatus" is intended to encompass both projection and printing apparatus.

One known limitation with spatial light modulators is that a device has only a limited bit range for addressing, thus can only provide a discrete number of intensity values. Typically 256 intensity values can be addressed and used with conventional spatial light modulators. While this can be sufficient for many imaging applications, there are environments for which the capability to obtain more than this discrete number of intensity values would be an advantage. Applications for which an increased capability for representing various intensity states would include medical imaging, entertainment, and simulation environments.

The spatial light modulator is capable of achieving a range of intensity values, with the actual discrete density value available for a given code value somewhat variable, based on bias voltage provided for the spatial light modulator. A slight change in bias voltage can mean that different intensity values result for the same data.

Conventionally, the bias voltage value used for a spatial light modulator is set at calibration, thereby fixing the set of intensity values in a 1:1 relationship with its corresponding set of input code values. Once calibrated, the spatial light modulator is configured to deliver this set of discrete intensity values, with no change unless recalibrated at a later date.

With earlier spatial light modulators, sluggish device response times precluded "re-tuning" or changing bias voltage during imaging operation. Even now, with continuing device development that has resulted in decreased response and settling times, imaging apparatus designers have not taken advantage of the ability to make dynamic changes to spatial light modulator tuning during operation.

Imaging apparatus designs have been proposed with arrangements that use multiple spatial light modulators for printing or projection, even using more than one spatial light modulator per color channel. However, designers have not exploited the capability for obtaining additional output intensities for the same set of pixels within a color channel. Thus, it can be seen that there would be advantages to a spatial light modulator-based imaging system that provides an increased number of light intensity values within a range.

SUMMARY OF THE INVENTION

It is an object of the present invention to provide an imaging apparatus using a spatial light modulator for forming an image from input image data wherein the spatial light modulator, at a predetermined bias voltage setting, is capable of providing, at each output pixel in an image, for any one of n input code values any one of n corresponding output intensity levels.

Briefly, according to one aspect of the present invention a method of forming an image having an increased number of output intensity levels m for a group of input data values, where m>n, comprises the following sequence:

(a) applying a first bias voltage to the spatial light modulator;

(b) mapping each input image data value in said group of said input image data values to a corresponding first input code value obtained from a first look-up table, wherein said first input code value is selected from a first set containing up to n input code values, and providing each said first input code value to the spatial light modulator;

(c) modulating an incident light beam at the spatial light modulator according to each said first input code value in order to form a first array of output image pixels, wherein the intensity of each output image pixel in said first array of output image pixels is conditioned by each said first input code value;

(d) applying a second bias voltage to the spatial light modulator;

(e) mapping each input image data value in said group of said input image data values to a corresponding second input code value obtained from a second look-up table, wherein said second input code value is selected from a second set containing up to n input code values, wherein said second set contains at least one input code value that is not in said first set, and providing each said second input code value to the spatial light modulator;

(f) modulating an incident light beam at the spatial light modulator according to each said second input code value in order to form a second array of output image pixels, wherein the intensity of each output image pixel in said second array of output image pixels is conditioned by each said second input code value.

In an alternative embodiment, the present invention provides a method for obtaining an increased number of output intensity levels, using only a single look-up table that has more than n possible output intensity levels, by varying the bias voltage to the spatial light modulator among two or more levels. In yet another alternative embodiment, the present invention can be used simply by switching between multiple look-up tables without changing the bias voltage level (that is, omitting step (d) above).

It is an feature of the present invention that it utilizes the response characteristics of a spatial light modulator based on its applied bias voltage, so that a higher bit density can be obtained using a single spatial light modulator device or using multiple devices.

It is an advantage of the present invention that it provides a method that increases the number of available light intensity levels provided by a spatial light modulator, with minimal added cost.

It is a further advantage of the present invention that it can be used with an imaging system that employs a single spatial light modulator or with a system that employs a plurality of spatial light modulators, including systems that use multiple spatial light modulators per color channel.

It is a further advantage of the present invention that it allows the use of different performance settings in an imaging device that uses a spatial light modulator, allowing the imaging device to adapt its behavior to different output media or viewing conditions.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1:
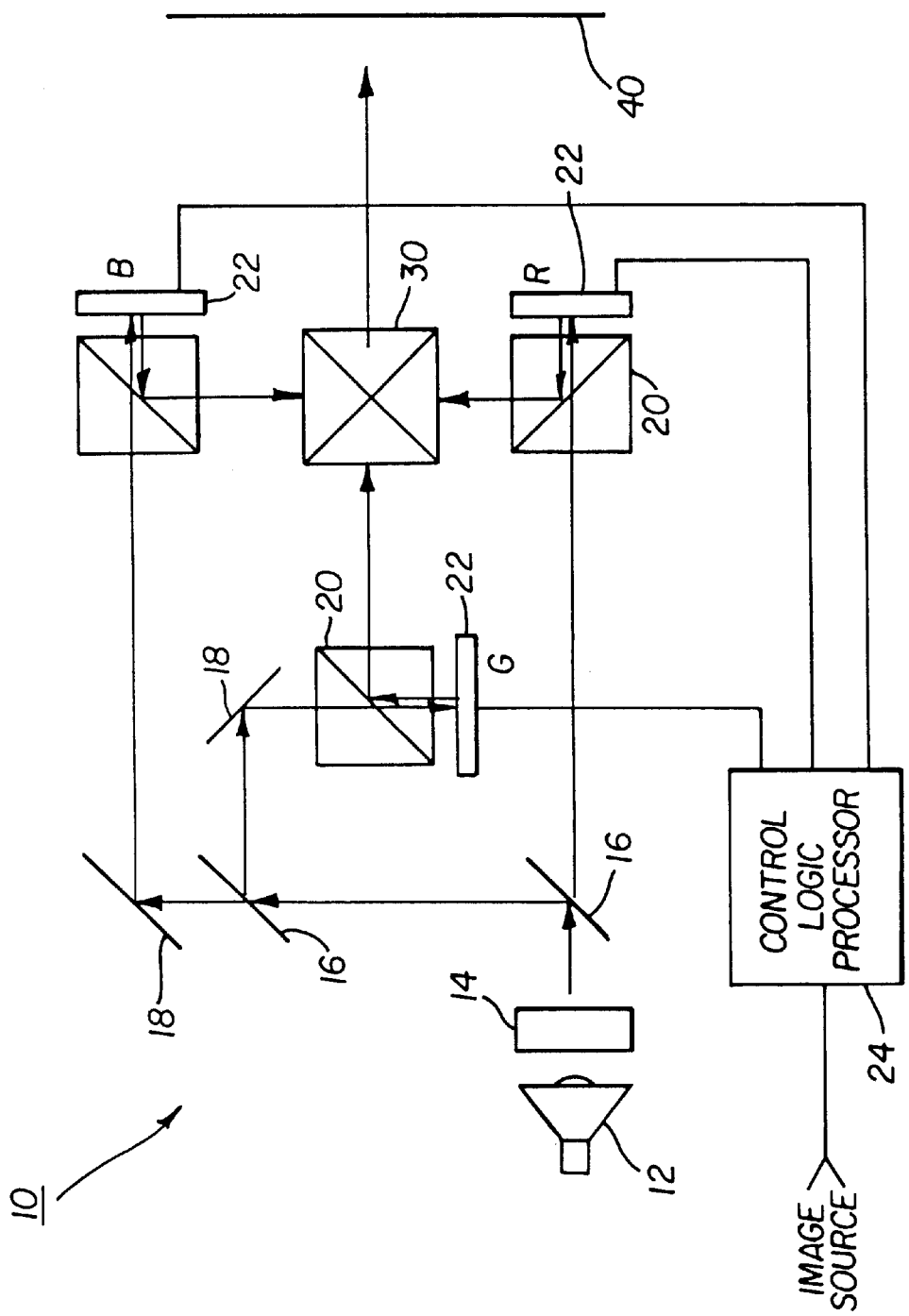
FIG. 1 is a schematic block diagram showing a prior art imaging apparatus design using reflective spatial light modulators.
Figure 2:
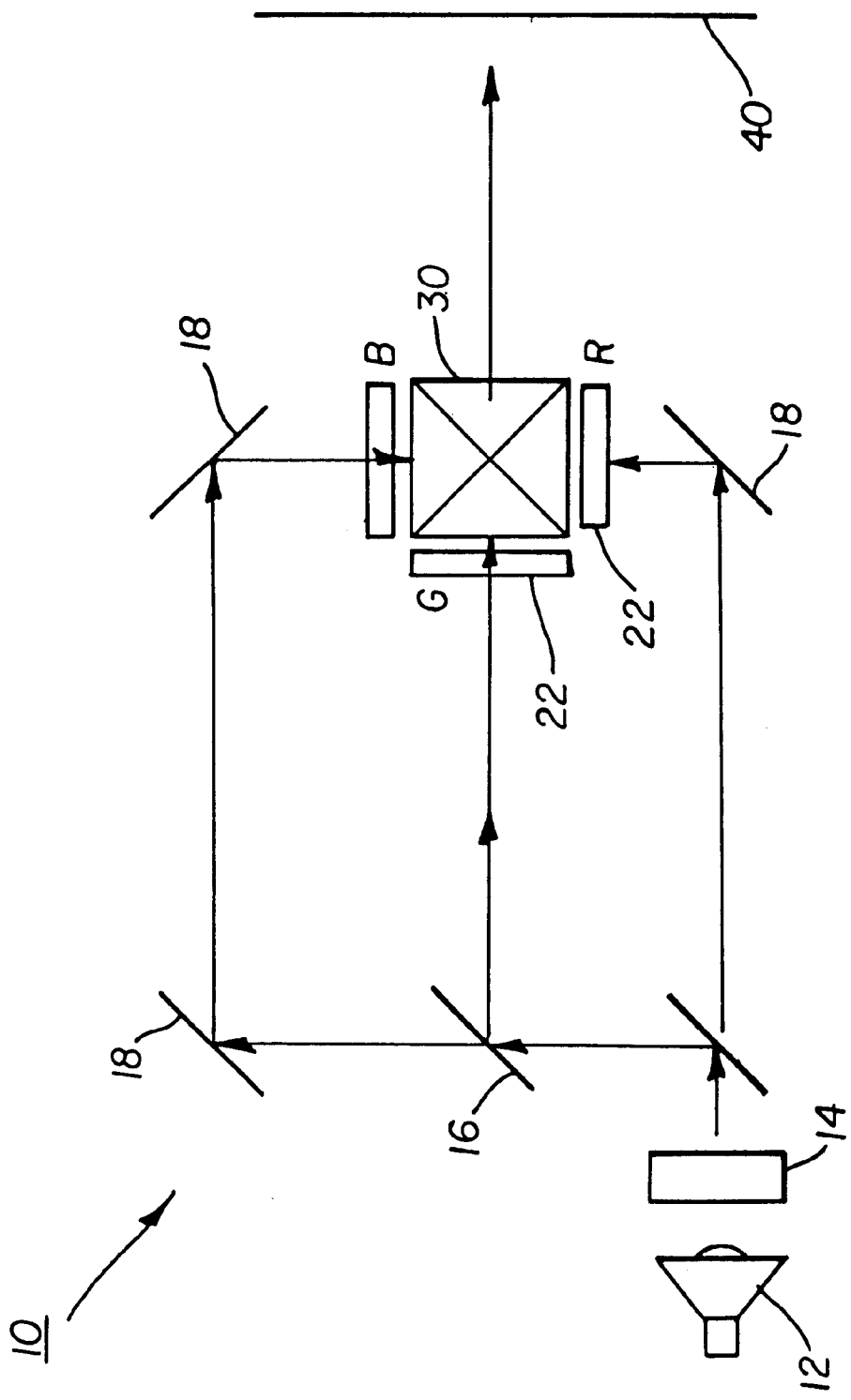
FIG. 2 is a schematic block diagram showing a prior art imaging apparatus design using transmissive spatial light modulators.

Referring now to FIG. 1 there is shown, in block diagram form, an imaging apparatus 10 that uses a number of spatial light modulators 22 that are of the reflective type. For comparison, FIG. 2 shows a block diagram of imaging apparatus 10 using spatial light modulators 22 of the transmissive type. It must be noted that the method and apparatus of the present invention apply to imaging apparatus 10 using spatial light modulators 22 of either reflective or transmissive type. For simplicity, the description that follows describes imaging apparatus 10 using a reflective spatial light modulator 22, following the basic model of FIG. 1. However, the implementation of the method and apparatus of the present invention could be equally applied to imaging apparatus 10 using transmissive spatial light modulators 22, with only minor changes that would be familiar to those skilled in the imaging arts.

Referring specifically to FIG. 1, it is instructive to trace the optics path, simplified to its more essential components, and the image data path of imaging apparatus 10. A light source 12 provides illumination that is conditioned by uniformizing optics 14. The source light beam is then split, using a series of dichroic beamsplitters 16 and directed by one or more mirrors 18, into separate color components, typically red, green, and blue (R, G, B). Each separate color component is modulated to form a modulated beam by a spatial light modulator 22. The separate R, G, and B modulated beams are then recombined, typically using an X-prism 30 and focused onto a surface 40. When using spatial light modulators 22 of the reflective type, as shown in FIG. 1, a polarization beamsplitter 20 is disposed to transmit unmodulated light having the appropriate polarization characteristics to spatial light modulator 22. Modulated light having the proper polarization is then reflected from polarization beamsplitter 20 to form the final image on surface 40.

A control logic processor 24 accepts input image data from an image source and provides output modulation data to spatial light modulators 22. In addition, control logic processor 24 also controls the bias voltage provided to each spatial light modulator 22. For simplicity, control logic processor 24 is not shown in FIG. 2; however, the same type of logic control is necessary for spatial light modulators 22 of the transmissive type.

It must be emphasized that the architectures of imaging apparatus 10 shown in FIGS. 1 and 2 are broadly generalized and admit a number of different embodiments and additions. For example, light source 12 and its accompanying uniformizing optics 14 can take any of a number of forms. Illumination could be provided in separate colors, such as using individual LEDs or LED arrays or by providing filters. Light source 12 could also be provided by one or more lasers, depending on the type of imaging apparatus 10. Control logic processor 24 can be embodied in a number of ways, typically, but not limited to, using a dedicated microprocessor and support circuitry. Lenses, such as projection lenses, condensers, and the like, are not shown in FIGS. 1 and 2 for simplicity. However, a number of different types of lens arrangements would be required for guiding and conditioning both unmodulated and modulated light, depending on the type of imaging apparatus 10. For a printer, for example, focusing lenses would be required to direct light to surface 40, where surface 40 comprises some form of photosensitive medium. For a projector, on the other hand, projection lenses would be required to project the final image onto surface 40, where surface 40 is a screen, mirror, or other image-projecting surface.

For the purpose of describing the present invention, imaging apparatus 10, as shown in overview in FIGS. 1 and 2, can be broadly understood to be an apparatus that forms an image using one or more spatial light modulators 22. It is instructive to emphasize that the method and apparatus of the present invention can be broadly applied to such a wide range of imaging apparatus 10 devices.

Spatial Light Modulator 22 Response Characteristics

Figure 3:
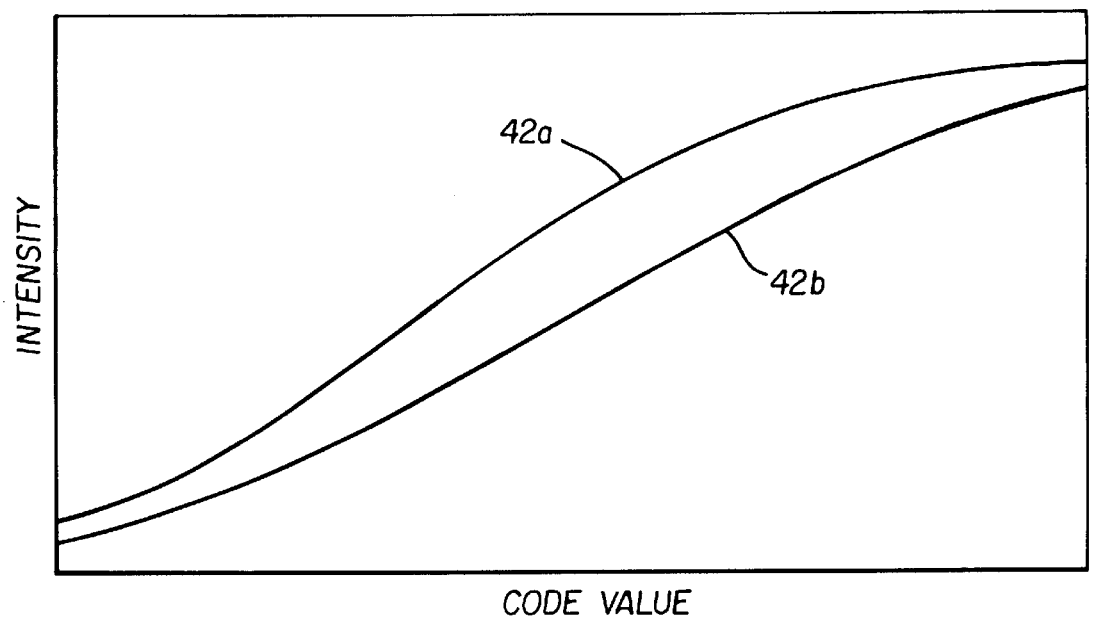
FIG. 3 shows modulation response of a typical electro-optical device, based on bias voltage level.

Referring to FIG. 3, there is represented a typical response characteristic of spatial light modulator 22 in providing a level of output light intensity based on an input code value. As is well known in the imaging arts, the response characteristic of spatial light modulator 22 can be changed by changing its applied bias voltage level. A response curve 42a shows the response characteristic of spatial light modulator 22 at a first bias voltage level. For comparison, a response curve 42b shows the response characteristic of the same spatial light modulator 22 at a different bias voltage level. By setting the maximum and minimum intensity levels, the voltage bias determines the overall contrast ratio for spatial light modulator 22.

Figure 4A:
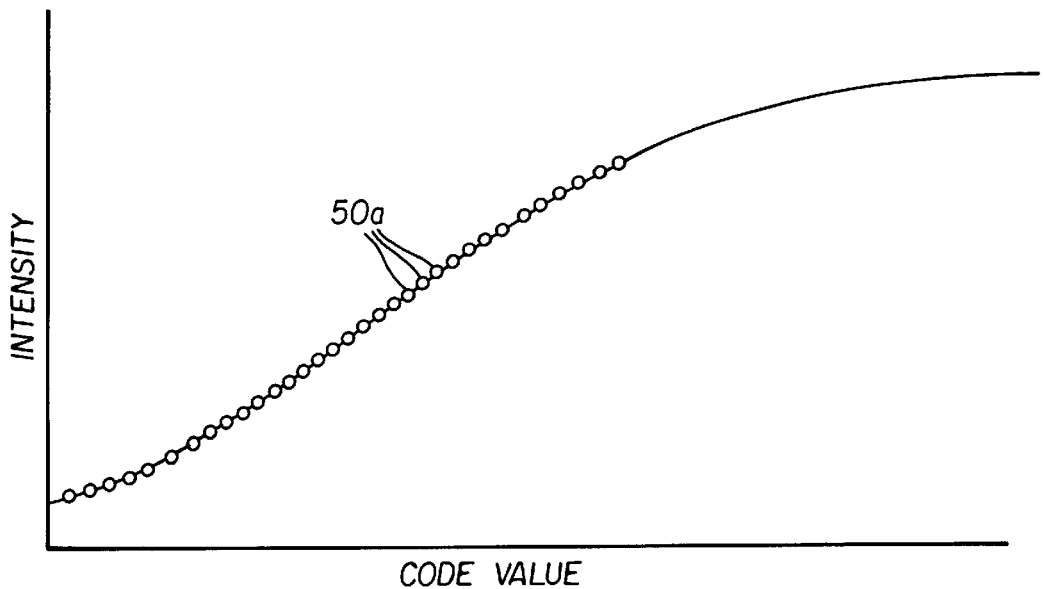
FIGS. 4a and 4b show two different mappings of input code values to discrete intensity values for a spatial light modulator provided with the same bias voltage level.

Given its characteristic curve as represented in FIG. 3, spatial light modulator 22 exhibits a specific response, in terms of relative intensity, based on its input code value. Referring to FIG. 4a, there are shown discrete mapped intensity levels 50a obtained for a set of code values. For simplicity, only a few representative mapped intensity levels 50a are shown. Depending on the type of spatial light modulator 22 device, the set of mapped intensity levels 50a thus obtained can be provided by applying different levels of input addressing voltage or by using different pulse-width modulation intervals, or by a combination of these methods. It is instructive to note, as subsequent examples show, that intensity values need not be evenly spaced along the characteristic response curve of spatial light modulator 22, but can have any suitable distribution over a range.

Figure 4B:
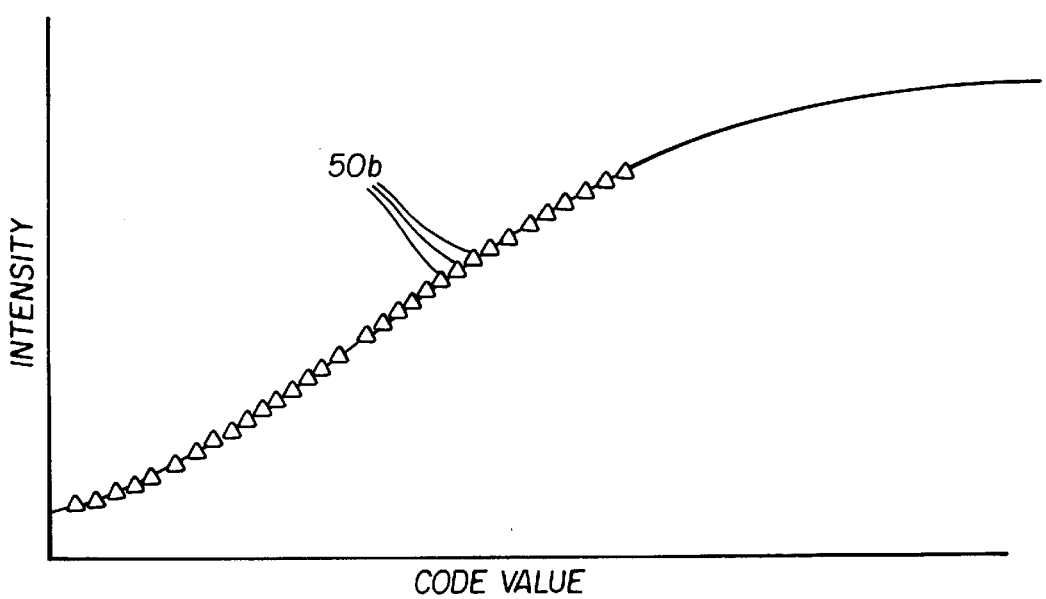

Given the same bias voltage, thus the same characteristic response curve, it may be possible to obtain a different set of discrete mapped intensity levels 50b for the same spatial light modulator 22, as is shown in FIG. 4b. This is the case, for example, if spatial light modulator 22 has an increased bit depth at its output, but can accept only a lesser number of input code values at its input. A separate mapping, by means of a look-up table (LUT) could provide different intensity output levels by correlating the same input image data value to two or more input code values that are provided to the spatial light modulator 22. Thus, for example, a first LUT would map a specific input image data value to a first input code value; a second LUT would map the same input image data value to a second input code value. Where imaging apparatus 10 is a printer, for example, this arrangement allows exposure of one set of pixels through the first LUT and exposure of alternate pixels through the second LUT. Where imaging apparatus 10 is a projector, on the other hand, the capability for obtaining different output intensity levels for the same pixel may be used to obtain an expanded number of intensity values within a range.

Obtaining Increased Number of Intensity Levels

In any imaging apparatus 10 implementation, spatial light modulator 22 is limited to a discrete number of possible output intensity levels, based on characteristics of the device. The method of the present invention applies biasing, mapping, and timing techniques in order to increase the effective number of intensity levels that is obtainable when using one or more spatial light modulators 22.

Figure 4C:
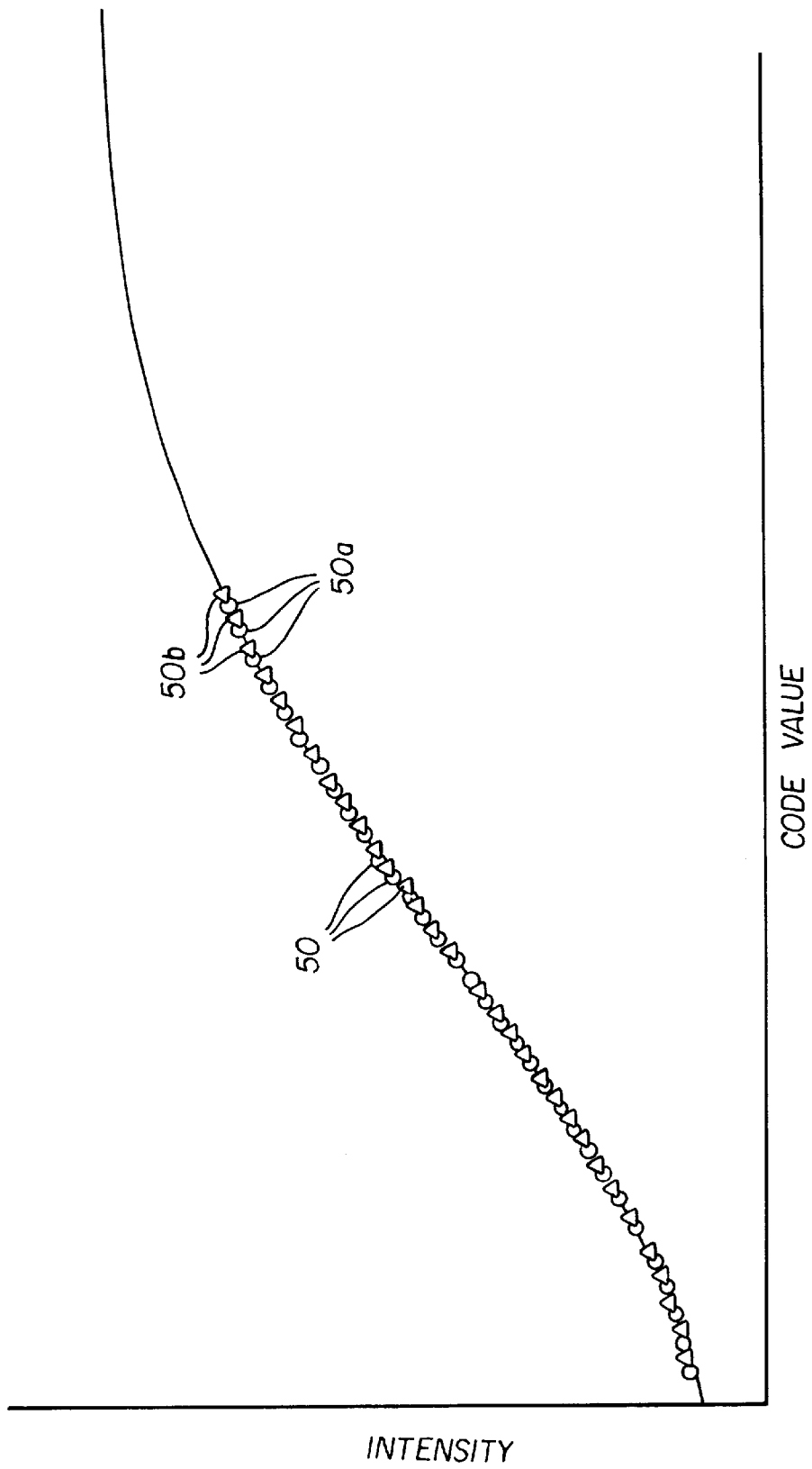
FIG. 4c shows an example of an enhanced light intensity mapping to code values with the example values of FIGS. 4a and 4b, using the method of the present invention.

Using a combination of LUTs and a multiplexed timing arrangement, it can readily be seen that it would be possible to combine different response curves 42a/b as represented in FIGS. 4a and 4b in order to achieve a combined response as represented in FIG. 4c. Here, the set of mapped intensity levels 50 that can be provided by a spatial light modulator 22 is a combination of mapped intensity levels 50a and 50b as shown.

Referring back to FIG. 3, it can be readily appreciated that it would also be possible to achieve different mapped intensity levels 50 from one spatial light modulator 22 by applying, in alternating fashion, one of two different bias voltages to the spatial light modulator 22. This adjustment, in combination with providing different mappings of input image data to input code values using different LUTs, could be used to effectively increase the available number of output intensity levels that could be reached using a single spatial light modulator 22.

Figure 5A:
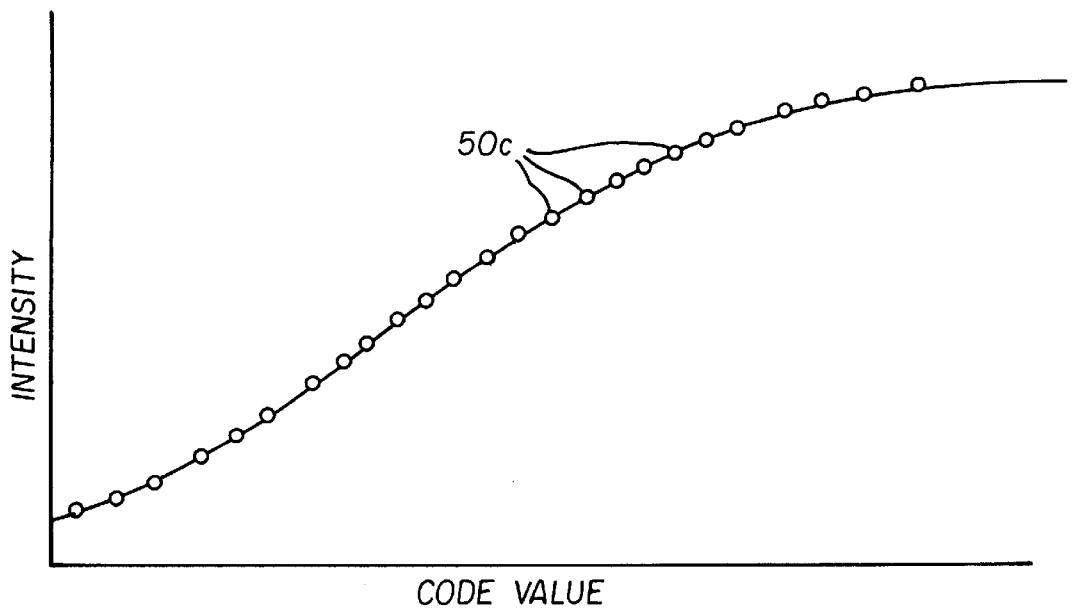
FIGS. 5a and 5b show alternate mappings of input code values, where the mapped intensity values can be clustered or broadly spread.
Figure 5B:
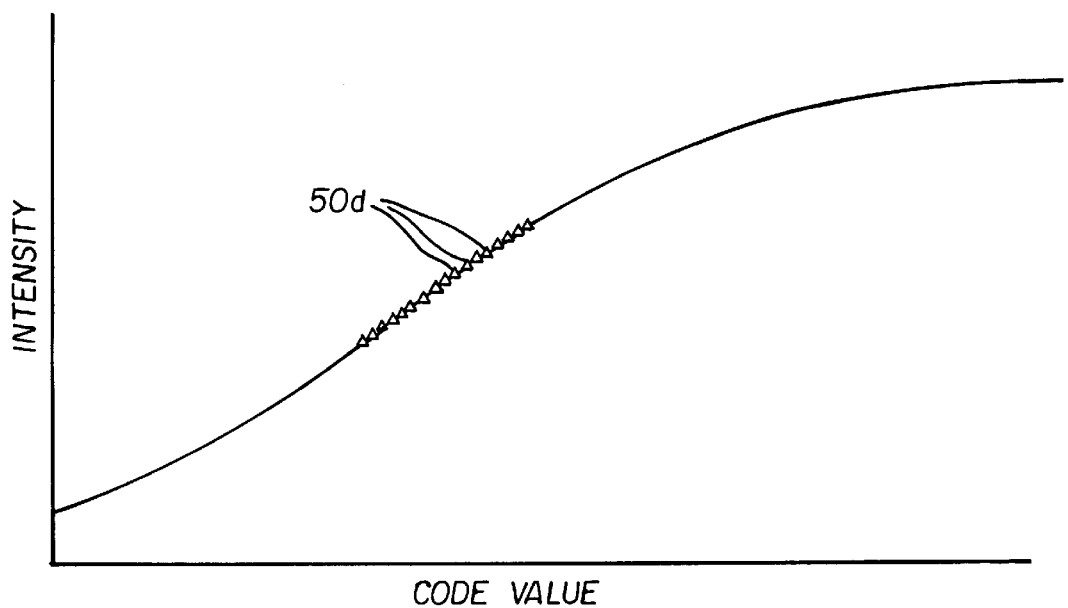
Figure 5C:
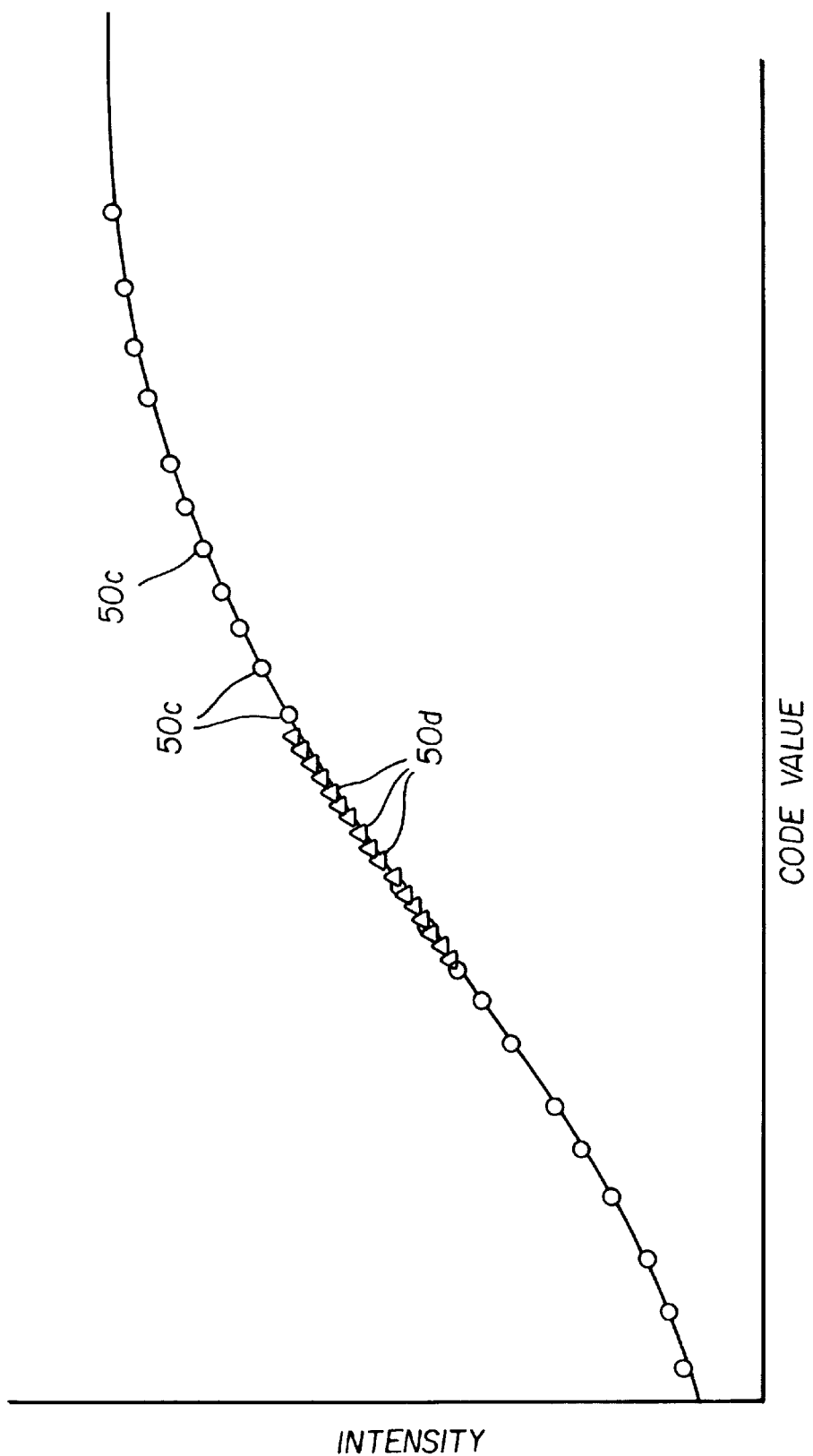
FIG. 5c shows an alternate example of an enhanced light intensity mapping to code values with the example values of FIGS. 5a and 5b, using the method of the present invention.

For some imaging conditions, particularly in printing applications, it may be useful to obtain enhanced intensity response over a well-defined range. For example, for reproduction of flesh tones or neutrals, it can be advantageous to provide finer gradations of intensity over a mid-tone range. Referring to FIG. 5a, there is shown, for a spatial light modulator 22, a mapping with a broad distribution of mapped intensity levels 50c, such as would be most useful for obtaining saturated colors. By comparison, referring to FIG. 5b, there is shown a mapping having a narrower distribution of mapped intensity levels 50d, such as would be most useful for obtaining flesh tones or mid-tones. Referring to FIG. 5c, there is represented what a combination of broadly (FIG. 5a) and narrowly (FIG. 5b) distributed mapped intensity levels 50c and 50d can mean in an imaging application. With two spatial light modulators 22 calibrated for such an arrangement of output intensities, for example, one spatial light modulator 22 can be used for imaging saturated colors; the other spatial light modulator 22 can be used for imaging neutral tones. As a result, more control over color is provided for imaging with this method. Alternately, given appropriate setup of voltage bias and LUT mapping, a single spatial light modulator 22 can be adapted to provide the benefits of enhanced intensity range, as suggested graphically in FIG. 5c.

Implementation Options

It can readily be appreciated that there can be a number of alternate implementation schemes used to manipulate bias voltage settings, input image data to input code value mappings, and timing in order to obtain an increased number of intensity values for imaging apparatus 10.

Figure 6:
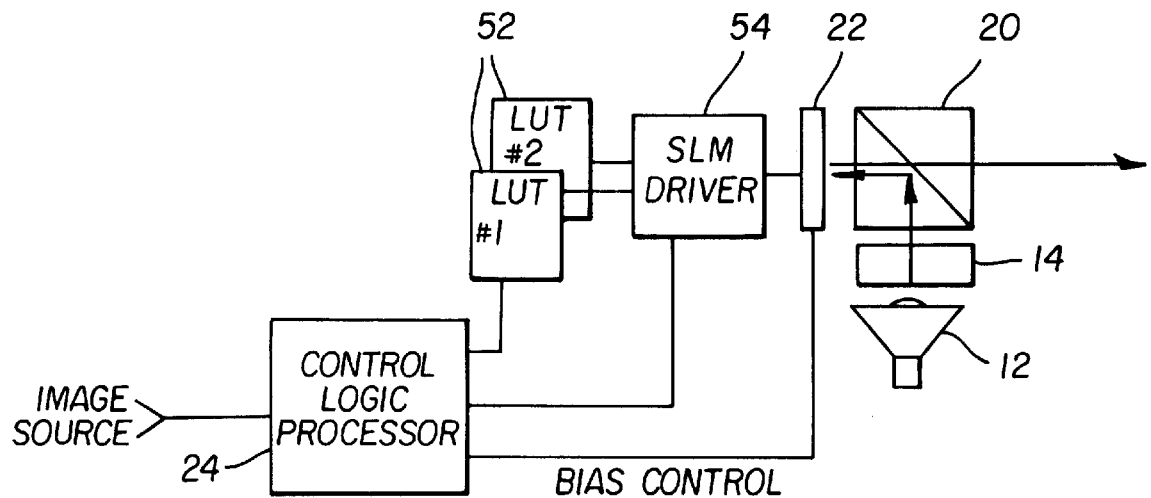
FIG. 6 is a schematic block diagram showing key components along a single color channel in one embodiment of the present invention.

Referring to FIG. 6, there is shown, in schematic form, the implementation of a single color channel in the simplest case of the preferred embodiment. Two LUTs 52 are provided to allow different mappings of input image data to input code values. A spatial light modulator driver 54 provides the support circuitry for modulating spatial light modulator 22. Control logic processor 24 controls the switching of each group of input image data to either the first or second LUT 52 and controls the operation of spatial light modulator driver 54 for each group of image data. In a preferred embodiment, the group of image data handled at one time represents a complete image frame. Other groupings are possible, typically in units of frames or in some fraction of a frame. Control logic processor 24 also provides bias control for adjusting spatial light modulator 22 voltage bias. This allows the option of setting a bias voltage that is best suited for use with first or second LUT 52. The bias voltage may not need to be changed when switching between LUTs 52.

Figure 7:
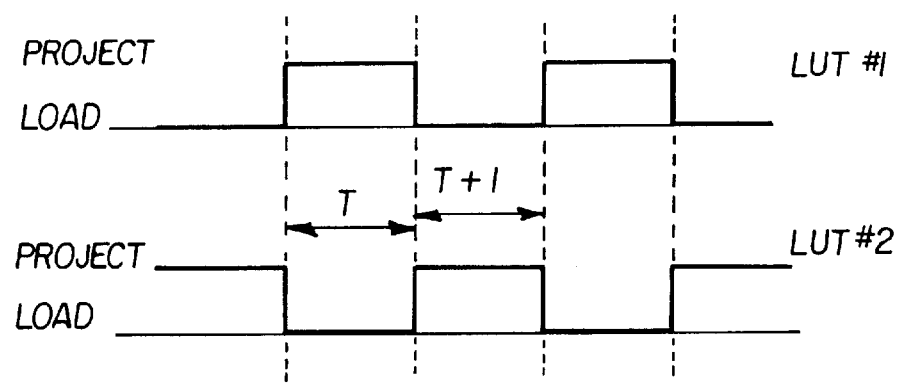
FIG. 7 is a timing chart showing the timing interrelationship between loading and using look-up tables in one embodiment of the present invention.

Referring to FIG. 7, there is shown a timing relationship for activating and using the LUTs 52 separately and for optionally changing voltage bias, using the example implementation of FIG. 6. As shown in FIG. 7, a simple alternating scheme would allow setup of conditions for achieving an increase in the number of intensity levels. Thus, for example, mapped intensity levels 50a of FIG. 4a would be stored in first LUT 52 of FIG. 6. Similarly, mapped intensity levels 50b of FIG. 4b would be stored in second LUT 52 of FIG. 6. During time interval T of FIG. 7, the group of input image data mapped through first LUT 52 of FIG. 6 would be actively modulating spatial light modulator 22, with voltage bias set at a first level. During this same time interval T, control logic processor 24 would be loading a group of input image data in readiness for use with second LUT #2. At next interval T+1, input image data mapped through second LUT 52 would be modulated, with voltage bias set at a second level. It is instructive to note that the same group of input image data may be loaded to LUT #1 and LUT #2 for modulation under different mapping and bias conditions in successive intervals.

As is readily understood to those familiar in the imaging arts, the averaging or integration activity of the human eye must be considered when using a timing arrangement such as is described above with reference to FIGS. 6 and 7. To avoid flicker in a projection apparatus, time interval T must be short enough to allow the appearance of continuous illumination. For this purpose, a time interval of 16 msec or shorter is sufficient.

Figure 8:
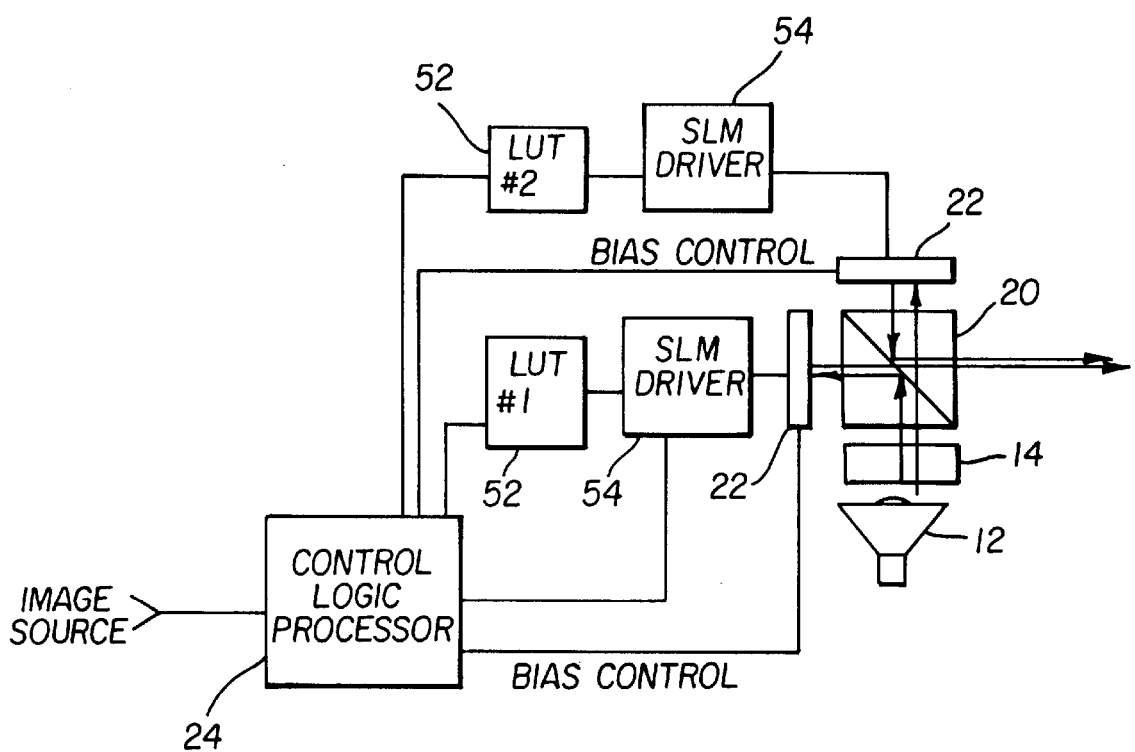
FIG. 8 is a schematic block diagram showing key components along a single color channel in an alternate embodiment of the present invention.

Referring to FIG. 8, there is shown, in schematic form, the implementation of a more complex embodiment, in which a single color channel utilizes two spatial light modulators 22. The arrangement of FIG. 8, while more costly to implement, provides the advantage of added brightness, since it would not be necessary to alternate the use of first and second LUT 52 data for modulation. Instead, both spatial light modulators 22 would be active at the same time, each spatial light modulator 22 modulating the appropriate set of image pixels. The voltage bias levels of the two spatial light modulators 22 would be set separately. Control logic processor 24 would be programmed with logic instructions for parsing the input image data in order to determine how to divide the data for each image frame into two sets, one set for each spatial light modulator 22.

It can readily be appreciated that the arrangement of components for imaging apparatus 10 in FIGS. 6 and 8 could be extended to each color channel. While FIGS. 6 and 8 show components for using reflective spatial light modulators 22, a similar arrangement would serve for using transmissive spatial light modulators 22.

Calibration

Calibration of imaging apparatus 10 allows use of multiple LUTs and multiple voltage bias settings during imaging operation. The calibration steps for LUT #1 and #2 52 setup to provide expanded bit depth are similar to those typically used in calibration of conventional imaging devices. In outline, this would require the following basic steps:

(1) apply a first bias voltage to spatial light modulator 22;
(2) for each of n input code values, illuminate and modulate spatial light modulator 22 to obtain a corresponding first light intensity;
(3) correlate the corresponding first light intensity to each of the n input code values to generate a first LUT 52;
(4) apply a second bias voltage to spatial light modulator 22;
(5) for each of n input code values, illuminate and modulate spatial light modulator 22 to obtain a corresponding second light intensity;
(6) correlate the corresponding second light intensity to each of the n input code values to generate a second LUT 52.

A number of variations are possible for LUT 52 generation, depending on the design of imaging apparatus 10 and on its intended environment. For example, it may not be necessary to change the bias voltage for spatial light modulator 22 in step (4) above, depending on how the present invention is embodied.

Stereoscopic Projection System Implementation

The method and apparatus of the present invention are also well-suited to implementation with stereoscopic projection systems, in which separate images are provided for left and right eyes of an observer.

Figure 9:
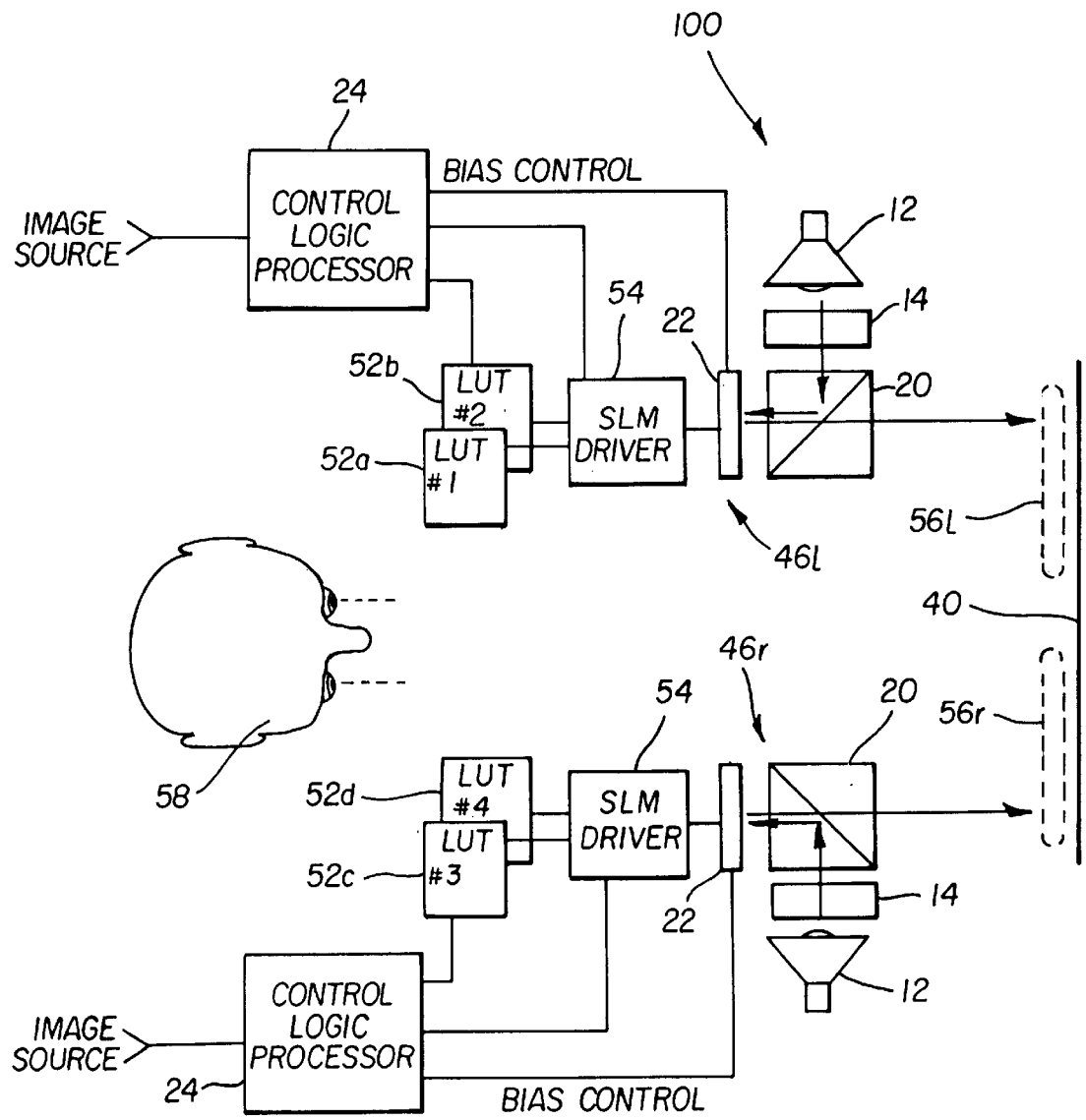
FIG. 9 is a schematic block diagram showing key components along a single color channel in an embodiment of the present invention for immersive systems.

FIG. 9 is a schematic block diagram showing key components along a single color channel in an embodiment of the present invention for a stereoscopic imaging apparatus 100. Here, a separate left image 56l and a separate right image 56r are presented by a corresponding left optical system 46l and right optical system 46r, respectively, to an observer 58. As is shown in FIG. 9, the image processing and optical components for left and right optical systems 46l and 46r are basically identical; only image data changes are necessary for providing the proper scene content for left and right images 56l and 56r. The optical paths, control functions, and timing are parallel to those described with reference to FIGS. 6, 7, and 8 above.

Figure 10:
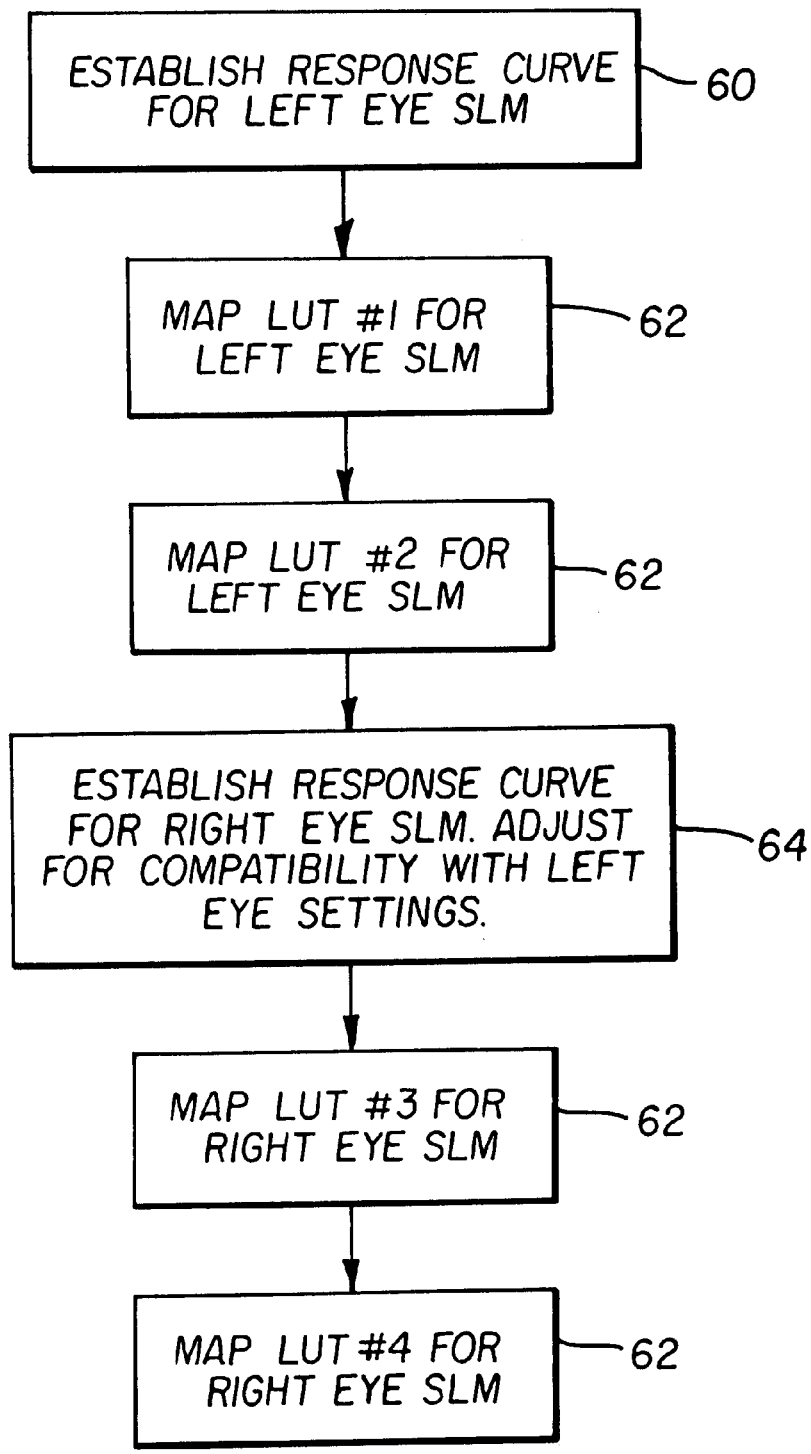
FIG. 10 is a flow chart showing the setup of a single color channel for the immersive system embodiment shown in FIG. 9.

Of special concern for design of stereoscopic imaging apparatus 100 using a multiplexed timing scheme such as shown in FIG. 7 is maintaining a proper balance between brightness for left and right images 56l and 56r. With this type of balance setup in mind, FIG. 10 is a flow chart illustrating the typical flow of stages in setup of a single color channel for stereoscopic imaging apparatus 100 as in the embodiment shown in FIG. 9. In a characterization step 60, a response curve, similar to that shown in FIG. 3, is obtained for spatial light modulator 22 in left optical system 46l. A voltage bias is determined to set the necessary contrast ratio for spatial light modulator 22. LUT mapping steps 62 then follow for first and second LUTs 52a and 52b in left optical system 46l, in order to obtain code value to intensity mappings similar to those of FIGS. 4a and 4b and corresponding input image data to code value mappings needed to obtain the desired mapped intensity levels 50. In a characterization and balance adjustment step 64, a response curve is similarly obtained for spatial light modulator 22 in right optical system 46r. A voltage bias is determined to set the contrast ratio for spatial light modulator 22 in right optical system 46r. In addition, adjustments can be made to balance brightness settings and contrast ratio for suitable left- and right-eye response.

Additional LUT mapping steps 62 then follow for third and fourth LUTs 52c and 52d in right optical system 46r, in order to obtain code value to intensity mappings similar to those of FIGS. 4a and 4b and corresponding input image data to code value mappings needed to obtain the desired mapped intensity levels 50. This provides initial setup necessary for implementation of the present invention in stereoscopic imaging apparatus 100.

Figure 11:
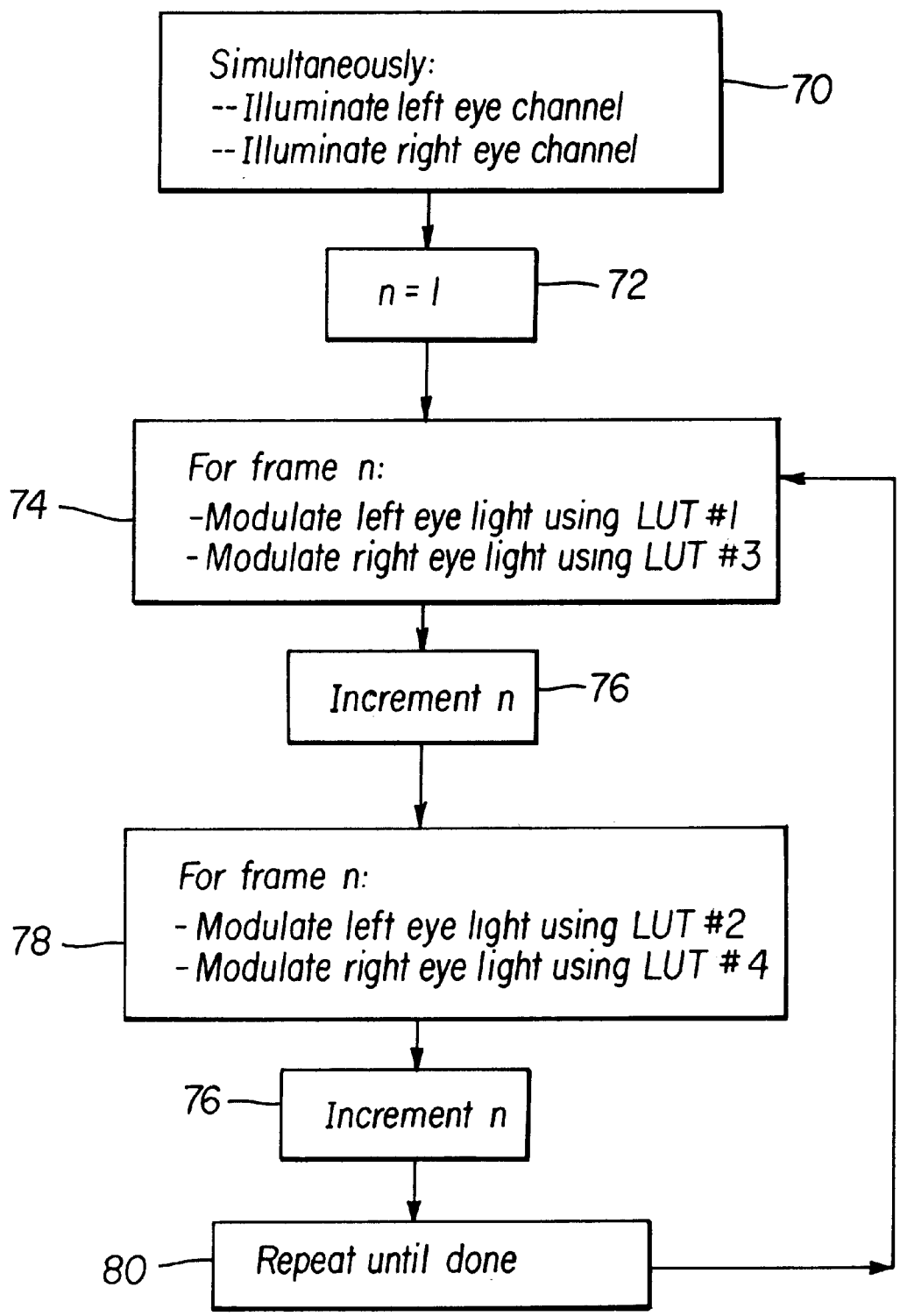
FIG. 11 is a flow chart showing the projection steps for the immersive system embodiment shown in FIG. 9.

Referring to FIG. 11, there is shown the overall sequencing of steps for projection of the stereoscopic image comprising left and right images 56l and 56r in stereoscopic imaging apparatus 100. In an initial illumination step, light sources 12 for both left and right optical systems 46l and 46r are activated. An initialization step 72 begins the sequencing, represented in FIG. 11 as variable n for a looping operation that follows. In a frame modulation step 74, for the duration of an image frame, left optical system 46l modulates light using first LUT 52a. Simultaneously, right optical system 46r modulates light using third LUT 52c. An increment step 76 follows to move to the next frame. In a subsequent frame modulation step 78, for the duration of an image frame, left optical system 46l modulates light using second LUT 52b. Simultaneously, right optical system 46r modulates light using fourth LUT 52d. Again, increment step 76 follows to move to the next frame. A test and repeat step 80 continues looping action through frame modulation steps 74 and 78 and the intervening control steps 76 until imaging operation is complete.

Alternate Embodiments

The present invention permits a number of alternate embodiments. For example, where two LUTs 52 are shown per channel, it would be possible to set up any number of additional LUTs 52 to suit different types of media, different types of images, audience preferences, and other variables. The image data itself could include data used to specify the setup of LUTs 52 and to set voltage bias levels for spatial light modulator 22 in order to achieve special imaging effects.

Where imaging system 10 is a printer, additional components could be employed to allow control logic processor 24 to sense and respond to the specific type of photosensitive media used as surface 40. Information encoded on the media or coupled to the media or to media packaging in some way could be used to specify LUT data itself, to give a recommended bias voltage setting, or to specify a mode for which an individual device should be set up for imaging. Similarly, image data for projection could include encoded information on LUT data or use, voltage bias settings, or preset mode for operation of imaging apparatus 10.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

Thus, what is provided is an apparatus and method for providing an expanded range of variable light intensity values in an imaging system that uses a spatial light modulator.

| PARTS LIST | |
|---|---|
| 10. | Imaging apparatus |
| 12. | Light source |
| 14. | Uniformizing optics |
| 16. | Dichroic beamsplitters |
| 18. | Mirrors |
| 20. | Polarization beamsplitter |
| 22. | Spatial light modulator |
| 24. | Control logic processor |
| 30. | X-prism |
| 40. | Surface |
| 42a. | Response curve |
| 42b. | Response curve |
| 46l. | Left optical system |
| 46r. | Right optical system |
| 50. | Mapped intensity levels |
| 50a. | Mapped intensity levels |
| 50b. | Mapped intensity levels |
| 50c. | Mapped intensity levels |
| 50d. | Mapped intensity levels |
| 52. | Look-Up Table, LUT |
| 52a. | First Look-Up Table, LUT |
| 52b. | Second Look-Up Table, LUT |
| 52c. | Third Look-Up Table, LUT |
| 52d. | Fourth Look-Up Table, LUT |
| 54. | Spatial light modulator driver |
| 56l. | Left image |
| 56r. | Right image |
| 58. | Observer |
| 60. | Characterization step |
| 62. | LUT mapping step |
| 64. | Characterization and balance adjustment step |
| 70. | Illumination step |
| 72. | Initialization step |
| 74. | Frame modulation steps |
| 78. | Frame modulation steps |
| 76. | Increment step |
| 80. | Test and repeat step |
| 100. | Stereoscopic imaging apparatus |

What is claimed is:

1. A method for enhancing bit depth in an imaging apparatus using a spatial light modulator comprising:

applying a first bias voltage to said spatial light modulator;

mapping a set of first input image data values to a first look-up table to provide a first set of input codes values to said spatial light modulator;

modulating an incident light beam at said spatial light modulator according to said first set of input code values;

applying a second bias voltage to said spatial light modulator;

mapping a second set of input image data values to a second look-up table to provide a second set of input code values; and modulating said incident light beam at said spatial light modulator according to said second set of input code values.

2. In an imaging apparatus using a spatial light modulator for forming a first image from input image data values wherein said spatial light modulator, at a predetermined bias voltage setting, is capable of providing, at each output pixel in said first image, for any one of n input code values, any one of n corresponding output intensity levels, a method of forming a second image having an increased number of output intensity levels m for a group of input data values, where m>n, the method comprising the following sequence:

(a) applying a first bias voltage to said spatial light modulator, (b) mapping each input image data value in said group of said input image data values to a corresponding first input code value obtained from a first look-up table, wherein said first input code value is selected from a first set containing up to n input code values, and providing each said first input code value to the spatial light modulator;

(c) modulating an incident light beam at the spatial light modulator according to each said first input code value in order to form a first array of output image pixels, wherein said intensity of each output image pixel in said first array of output image pixels is conditioned by each said first input code value;

(d) applying a second bias voltage to the spatial light modulator;

(e) mapping each input image data value in said group of said input image data values to a corresponding second input code value obtained from a second look-up table, wherein said second input code value is selected from a second set containing up to n input code values, wherein said second set contains at least one input code value that is not in said first set, and providing each said second input code value to the spatial light modulator; and (f) modulating said incident light beam at said spatial light modulator according to each said second input code value in order to form a second array of output image pixels, wherein said intensity of each output image pixel in said second array of output image pixels is conditioned by each said second input code value.

3. The method of claim 2 further comprising the step of directing said first array of said output image pixels towards a photosensitive medium.

4. The method of claim 3 wherein said imaging apparatus detects the type of said photosensitive medium.

5. The method of claim 4 wherein said step of applying said first bias voltage is conditioned by the type of said photosensitive medium.

6. The method of claim 4 wherein said step of applying said second bias voltage is conditioned by the type of said photosensitive medium.

7. The method of claim 4 wherein said step of mapping each input image data value to a corresponding first input code value is conditioned by the type of said photosensitive medium.

8. The method of claim 4 wherein said step of mapping each inputs image data value to a corresponding second input code value is conditioned by the type of said photosensitive medium.

9. The method of claim 2 further comprising the step of projecting said first array of said output image pixels towards a display surface.

10. The method of claim 2 wherein said group of input image data values comprises a frame.

11. The method of claim 2 wherein said input image data value comprises data that conditions said first look-up table.

12. The method of claim 2 wherein said spatial light modulator forms an array of said output image pixels by selectively reflecting portions of said incident light beam.

13. The method of claim 2 wherein said spatial light modulator forms an array of said output image pixels by selectively transmitting portions of said incident light beam.

14. The method of claim 2 wherein the step of applying said first bias voltage to the spatial light modulator comprises the step of applying a first bias voltage to an LCD.

15. The method of claim 2 wherein the step of applying said first bias voltage to the spatial light modulator comprises the step of applying a first bias voltage to a digital micromirror device.

16. In an imaging apparatus using a spatial light modulator to provide one or more image frames, wherein said spatial light modulator has a bit depth range limited to a number n bits, a method of increasing said bit depth range to a number m bits, where m>n, the method comprising:

(a) generating, for each input image data value, a first look-up table for mapping said each input image data value to a first code value using the steps of:

(a1) applying a first bias voltage to said spatial light modulator;

(a2) iteratively providing each of n first code values as input to said spatial light modulator, measuring a first light intensity at each of n first code values, and, based on said light intensity, correlating said each of n first code values to each of said image data values;

(b) generating, for each input image data value, a second look-up table for mapping said each input image data value to a second code value using the steps of:

(b1) applying a second bias voltage to said spatial light modulator;

(b2) iteratively providing each of n second code values as input to said spatial light modulator, measuring a second light intensity at each of n second code values, and, based on said light intensity, correlating said each of n second code values to each of said image data values; and (c) successively repeating the following sequence of steps for each successive image frame:

(c1) correlating each input image data value in said each successive image frame to a corresponding said first code value from said first look-up table to create a first set of said code values;

(c2) with said first bias voltage applied to the spatial light modulator, providing said first set of said code values to the spatial light modulator;

(c3) correlating each input image data value in said each successive image frame to a corresponding said second code value from said second look-up table to create a second set of said code values;

(c4) with said second bias voltage applied to the spatial light modulator, providing said second set of said code values to the spatial light modulator.

17. The method of claim 16 wherein the step of applying said first bias voltage to said spatial light modulator comprises the step of applying a first bias voltage to an LCD.

18. The method of claim 16 wherein the step of applying said first bias voltage to said spatial light modulator comprises the step of applying a first bias voltage to a digital micromirror device.

19. In an imaging apparatus using, in a color channel, a first and a second spatial light modulator to modulate an incident light beam in order to form an image-bearing modulated beam according to a frame of input image data values, a method for increasing the number of intensity levels within said image-bearing modulated beam, the method comprising:
(a) for said first spatial light modulator, generating a first look-up table that correlates each input image data value in said frame to a corresponding first code value;
(b) for said second spatial light modulator, generating a second look-up table that correlates each input image data value in said frame to a corresponding second code value, wherein the set of said second code values in said second look-up table is not identical with the set of said first code values in said first look-up table;
(c) using said first look-up table, forming a first set of code values for modulating said first spatial light modulator by assigning, to each input image data value in said frame, one of said corresponding first code values from said first look-up table;
(d) using said second look-up table, forming a second set of code values for modulating said second spatial light modulator by assigning, to each input image data value in said frame, one of said corresponding second code values from said second look-up table;
(e) modulating said incident light beam at said first spatial light modulator according to said first set of code values; and
(f) modulating said incident light beam at said second spatial light modulator according to said second set of code values.

20. The method of claim 19 wherein the step of modulating said incident light beam at said first spatial light modulator comprises the step of applying a first bias voltage to said spatial light modulator.

21. The method of claim 20 wherein the step of applying a second bias voltage is conditioned by information about a photosensitive medium loaded in the imaging apparatus.

22. The method of claim 19 wherein the step of applying a first bias voltage is conditioned by information about a photosensitive medium loaded in the imaging apparatus.

23. The method of claim 19 wherein the step of modulating said incident light beam at said second spatial light modulator comprises the step of applying a second bias voltage to said spatial light modulator.

24. The method of claim 19 wherein the step of modulating said incident light beam at said first spatial light modulator comprises the step of modulating said incident light beam at an LCD.

25. The method of claim 19 wherein the step of modulating said incident light beam at said second spatial light modulator comprises the step of modulating said incident light beam at an LCD.

26. A method for providing increased light intensity levels in a stereoscopic display wherein a left spatial light modulator generates a left eye image and a right spatial light modulator generates a right eye image, the method comprising:
(a) providing the left-eye image by:
(a1) applying a first bias voltage to said left spatial light modulator and maintaining a first look-up table for mapping input image data values to input code values for said left spatial light modulator;
(a2) providing, from said first look-up table, for each input image data value in a left frame, a corresponding first input code value;
(a3) providing a left incident light beam to said left spatial light modulator for forming a first array of said left output image pixels, the intensity of each said left output image pixel conditioned by each said first input code value;
(a4) applying a second bias voltage to said left spatial light modulator and maintaining a second look-up table for mapping input image data values to input code values for said left spatial light modulator;
(a5) providing, from said second look-up table, for each input image data value in said left frame, a corresponding second input code value;
(a6) providing said left incident light beam to said left spatial light modulator for forming a second array of said left output image pixels, the intensity of each said left output image pixel conditioned by each said second input code value;
(b) providing the right-eye image by:
(b1) applying a third bias voltage to said right spatial light modulator and maintaining a third look-up table for mapping input image data values to input code values for said right spatial light modulator,
(b2) providing, from said third look-up table, for each input image data value in a right frame, a corresponding third input code value;
(b3) providing a right incident light beam to said right spatial light modulator for forming a third array of said right output image pixels, the intensity of each said right output image pixel conditioned by each said third input code value;
(b4) applying a fourth bias voltage to said right spatial light modulator and maintaining a fourth look-up table for mapping input image data values to input code values for said right spatial light modulator;
(b5) providing, from said fourth look-up table, for each input image data value in said right frame, a corresponding fourth input code value;
(b6) providing said right incident light beam to said right spatial light modulator for forming a fourth array of said right output image pixels, the intensity of each said right output image pixel conditioned by each said fourth input code value.

27. An image forming apparatus for forming, from an incident beam in at least one color channel, according to input image data, an image-bearing modulated beam comprising a frame of image pixels, wherein each image pixel has a predetermined intensity, the apparatus comprising:
(a) a light source for providing said incident beam on said at least one color channel;
(b) a first look-up table for assigning a first input code value to each input image data value in said frame;
(c) a first spatial light modulator for modulating said incident light beam to form a first modulated beam according to each said first input code value;
(d) a second look-up table for assigning a second input code value to each input image data value in said frame;
(e) a second spatial light modulator for modulating said incident light beam to form a second modulated beam according to each said second input code value; and
(f) a beam combining element for combining said first modulated beam and said second modulated beam to form said image-bearing modulated beam.

28. The apparatus of claim 27 wherein said light source comprises a filter.

29. The apparatus of claim 27 wherein said light source comprises at least one LED.

30. The apparatus of claim 27 wherein said light source comprises at least one laser.

31. The apparatus of claim 27 wherein said beam-combining element comprises a polarizing beamsplitter.

32. The apparatus of claim 27 wherein said first spatial light modulator is a digital micromirror.

33. The apparatus of claim 27 wherein said second spatial light modulator is a digital micromirror.

34. The apparatus of claim 27 wherein said first spatial light modulator is a liquid crystal device.

35. The apparatus of claim 34 wherein said liquid crystal device is reflective.

36. The apparatus of claim 34 wherein said liquid crystal device is transmissive.

37. The apparatus of claim 27 wherein said second spatial light modulator is a liquid crystal device.

38. The apparatus of claim 37 wherein said liquid crystal device is reflective.

39. The apparatus of claim 37 wherein said liquid crystal device is transmissive.

40. A stereoscopic imaging apparatus for forming a left-eye and a right-eye image according to input image data in a left frame and input image data in a right frame, the apparatus comprising:
   (a) a left optical system for providing a left-eye image-bearing modulated beam, comprising:
      (a1) a first light source for providing an incident beam on at least one color channel;
      (a2) a first look-up table for assigning a first input code value to each input image data value in said left frame;
      (a3) a first spatial light modulator for modulating said incident light beam to form a first modulated beam according to each said first input code value;
      (a4) a second look-up table for assigning a second input code value to each input image data value in said left frame;
      (a5) a second spatial light modulator for modulating said incident light beam to form a second modulated beam according to each said second input code value;
      (a6) a left beam combining element for combining said first modulated beam and said second modulated beam to form said left-eye image-bearing modulated beam;
   (b) a right optical system for providing a right-eye image-bearing modulated beam, comprising:
      (b1) a second light source for providing an incident beam on at least one color channel;
      (b2) a third look-up table for assigning a third input code value to each input image data value in said right frame;
      (b3) a third spatial light modulator for modulating said incident light beam to form a third modulated beam according to said third input code value;
      (b4) a fourth look-up table for assigning a fourth input code value to each input image data value in said right frame;
      (b5) a fourth spatial light modulator for modulating said incident light beam to form a fourth modulated beam according to said fourth input code value; and
   (c) a second beam combining element for combining said third modulated beam and said fourth modulated beam to form said right-eye image-bearing modulated beam.

41. The apparatus of claim 40 wherein said first light source comprises a filter.

42. The apparatus of claim 40 wherein said second light source comprises a filter.

43. The apparatus of claim 40 wherein said first light source comprises at least one LED.

44. The apparatus of claim 40 wherein said second light source comprises at least one LED.

45. The apparatus of claim 40 wherein said first light source comprises at least one laser.

46. The apparatus of claim 40 wherein said second light source comprises at least one laser.

47. The apparatus of claim 40 wherein said first beam-combining element comprises a polarizing beamsplitter.

48. The apparatus of claim 40 wherein said second beam-combining element comprises a polarizing beamsplitter.

49. The apparatus of claim 40 wherein said first spatial light modulator is a digital micromirror device.

50. The apparatus of claim 40 wherein said second spatial light modulator is a digital micromirror device.

51. The apparatus of claim 40 wherein said third spatial light modulator is a digital micromirror device.

52. The apparatus of claim 40 wherein said fourth spatial light modulator is a digital micromirror device.

53. The apparatus of claim 40 wherein said first spatial light modulator is a liquid crystal device.

54. The apparatus of claim 53 wherein said first spatial light modulator is reflective.

55. The apparatus of claim 53 wherein said first spatial light modulator is transmissive.

56. The apparatus of claim 40 wherein said second spatial light modulator is a liquid crystal device.

57. The apparatus of claim 56 wherein said second spatial light modulator is reflective.

58. The apparatus of claim 56 wherein said second spatial light modulator is transmissive.

59. The apparatus of claim 40 wherein said third spatial light modulator is a liquid crystal device.

60. The apparatus of claim 59 herein said third spatial light modulator is reflective.

61. The apparatus of claim 59 herein said third spatial light modulator is transmissive.

62. The apparatus of claim 40 wherein said fourth spatial light modulator is a liquid crystal device.

63. The apparatus of claim 62 wherein said fourth spatial light modulator is reflective.

64. The apparatus of claim 62 wherein said fourth spatial light modulator is transmissive.

65. An image forming apparatus for forming, from an incident beam in at least one color channel, according to input image data values an image-bearing modulated beam comprising a frame of image pixels, wherein each image pixel has a predetermined intensity, the apparatus comprising:
   (a) a light source for providing said incident beam for said at least one color channel;
   (b) a first look-up table for assigning a first input code value to each input image data value in said frame;
   (c) a spatial light modulator for modulating said incident light beam to form a first modulated beam according to each said first input code value;
   (d) a second look-up table for assigning a second input code value to each input image data value in said frame; and
   (e) wherein said spatial light modulator modulates said incident light beam to form a second modulated beam according to each said second input code value.

66. An image forming apparatus as in claim 65 wherein each of said first input code values correlates a first output intensity with a first bias voltage.

67. An image forming apparatus as in claim 65 wherein each of said second input code values correlates a second intensity level to a second bias voltage.

68. An image forming apparatus for forming an image-bearing modulated beam from an incident beam for at least one color channel according to input image data values, wherein each image pixel of said modulated beam has a predetermined intensity, said apparatus comprising:

(a) a light source for providing said incident beam for said at least one color channel;

(b) a first look-up table for assigning a first input code value to each input image data value in a first frame;

(c) a spatial light modulator for modulating said incident light beam to form a first modulated beam according to each said first input code value;

(d) a second look-up table for assigning a second input code value to each input image data value in a second frame; and (e) wherein said spatial light modulator modulates said incident light beam to form a second modulated beam according to each said second input code value.

69. An image forming apparatus as in claim 68 wherein each of said first input code values correlates a first output intensity with a first bias voltage.

70. An image forming apparatus as in claim 68 wherein each of said second input code values correlates a second intensity level to a second bias voltage.

71. An image forming apparatus as in claim 68 wherein a time interval between said first frame and said second frame is less than 1/16 mscc.

* * * * *